(12) United States Patent
Kinghorn

(10) Patent No.: US 6,192,187 B1
(45) Date of Patent: Feb. 20, 2001

(54) VIDEO RECORDER

(75) Inventor: John R. Kinghorn, Brockenhurst (GB)

(73) Assignee: U.S. Philips Corporation, New York, NY (US)

( * ) Notice: Under 35 U.S.C. 154(b), the term of this patent shall be extended for 0 days.

(21) Appl. No.: 09/137,799

(22) Filed: Aug. 20, 1998

(30) Foreign Application Priority Data

Aug. 30, 1997 (GB) ................................................ 9718324

(51) Int. Cl.$^7$ .................................................. H04N 5/91
(52) U.S. Cl. .............................. 386/83; 386/46; 386/95; 348/906
(58) Field of Search ................................. 386/1, 46, 83, 386/69, 95; 348/460, 461, 467, 468, 564, 568, 906; 358/147

(56) References Cited

U.S. PATENT DOCUMENTS

| | | | |
|---|---|---|---|
| 5,761,371 | * 8/1999 | Ohno et al. | 386/83 |
| 5,790,744 | * 8/1998 | Park | 386/95 |
| 5,809,204 | * 9/1998 | Young et al. | 386/83 |
| 5,832,173 | * 11/1998 | Teraswaw et al. | 386/69 |
| 5,835,153 | * 11/1998 | Pratt et al. | 348/461 |
| 5,915,068 | * 6/1999 | Levine | 386/46 |
| 5,943,467 | * 8/1999 | Beyers et al. | 348/906 |

FOREIGN PATENT DOCUMENTS

| | | | |
|---|---|---|---|
| 3441152 | * 5/1986 | (DE) | G11B/5/09 |
| 0300562A1 | 1/1989 | (EP) | H04N/7/08 |
| 0692790A2 | 7/1995 | (EP) | G11B/27/39 |
| 0692790 | * 1/1996 | (EP) | G11B/27/30 |
| 0797354 | 9/1997 | (EP) | H04N/5/92 |
| 0022776 | * 1/1991 | (JP) | 358/147 |
| 3-268589 | 11/1991 | (JP) | H04N/5/78 |
| 7-021748 | 1/1995 | (JP) | G11B/27/34 |

* cited by examiner

Primary Examiner—Wendy Garber
Assistant Examiner—Vincent F. Boccio
(74) Attorney, Agent, or Firm—Edward W. Goodman

(57) ABSTRACT

A tape indexing arrangement for video recorders records the index on the tape using standard broadcast teletext codes. When a tape is inserted, the contents list it contains is written onto an index RAM in the recorder (200). When a new program is recorded, a program identification is generated from PDC or EPG data (202). At a suitable later time, the contents of the index RAM are recorded on the tape (204).

10 Claims, 6 Drawing Sheets

VIDEO RECORDER

BACKGROUND OF THE INVENTION

1. Field of the Invention

The invention relates to video recorders and, in particular but not exclusively, to arrangements for locating desired contents on a video tape.

2. Description of the Related Art

Known indexing systems in video recorders provide an attractive and user friendly way of obtaining easy access to a desired position on the tape for recording or playback of a program. Such arrangements generally enable access to a non-volatile memory in the video recorder in which a list of the contents of a number of tapes are stored. Access to the list relevant to a particular tape is by means of entering a tape number allocated to that tape. This access may be manual or automatic if means for identifying a particular tape is provided. This list can be viewed on the associated television display and moving a cursor to a desired item can be made to cause the tape to wind automatically to the corresponding position ready for playback or to record a new item.

Such an arrangement is disclosed in for example Patent Abstracts of Japan, Publication No. 07021748A. Such systems have, however, the disadvantage that the indexing only functions when the tapes are inserted into the VCR on which they were recorded, since the information as to what is on the tape is only present in the memory within that VCR. As a result, the indexing system will not work if the tape is played in a different VCR.

A system is described in European Patent Application EPA 0692790 for indexing magnetic tapes. This publication discloses a magnetic recording/reproducing apparatus having a capability of allowing contents of records on a magnetic tape to be discriminatively identified, and a capability for displaying closed captions includes a tape map memory for storing contents recorded on a tape and a tape map controller. As a manual input facility, a tape map button, a caption button, a playback button, a stop button and others, are provided. Upon loading of a tape undergone recording (s), the tape map button is pushed to display, on a monitor screen, tape map information concerning the contents of program(s) recorded on the loaded tape, temporal duration (s) of the programs and history of playback of the tape.

The closed caption data transmission facility is one provided in the USA and is not widely available elsewhere. It has been designed for the provision of subtitles for the hard of hearing and has been designed as a system in such a way that it is readily recordable on a VHS standard video recorder. As described in EPA 0692790, the closed caption data is extended to enable indexing information to be encoded in the same way and to derive program information from the transmitted closed caption transmissions. Such an arrangement is not useful in most European countries as there are no closed caption transmissions.

SUMMARY OF THE INVENTION

It is an object of the invention to enable the provision of a tape indexing arrangement in video cassette recorders, in which tapes recorded on one video cassette recorder can be replayed using the indexing facility on a different video cassette recorder.

The invention provides a method of controlling a video recorder according to the VHS standard, the video recorder including means for decoding data defining displayable text and/or control functions recorded on a tape as a multilevel code at a data rate lower than that of the original data and within the bandwidth of the recorder, wherein the data includes row and column address codes for defining cursor positions on a display screen of an associated television receiver, and function codes defining tasks to be performed on initiation of a command instruction when the cursor is displayed at a given location, the method comprising the steps of reading data from the tape, positioning the cursor at a desired one of the defined positions on the display screen, and initiating the task to be performed using the function codes associated with the cursor location.

In this way, the user can cause the video recorder to wind the tape to a selected position, the selected position being defined by data written onto the tape the data having an original data rate greater than that which can be recorded and reliably reproduced by a VHS recorder. The data may be, for example, according to the Multimedia Hypertext Expert Group MHEG-5 standard or in Hypertext Mark Up Language HTML format. In the embodiments described with reference to the drawings, the data is teletext data and, in particular, but not exclusively, teletext data according to the World System Teletext Standard. The invention, however, is not limited to using data encoded according to a teletext standard and the person skilled in the art will be capable of adapting it to any given data format. By appropriately preprogramming these data codes, a degree of interactivity can be obtained. Then, one out of a multiplicity of choices can be selected and further choices made from the displayed result in a branching fashion. In an alternative scenario, a quiz sequence could be generated, the function codes selecting a page which gives an indication as to whether a multiple choice answer selected by means of the cursor was correct and, if not, showing a teletext page explaining the correct answer.

When the data is teletext data as defined in the World System Teletext Standard, the row and column address codes and the associated function codes may be contained in teletext packets X/26.

This enables a standard teletext decoder to decode the function codes and the indexing decoder to control the tape winding circuits to wind the tape to the correct position for display of video clips etc.

The function codes may be arranged to cause one or more of the following actions:

selecting a teletext page number;

selecting the audio status;

selecting audio description channel;

selecting the video status;

causing a video tape to wind to a defined position;

causing a command to be sent to associated equipment;

selecting a data channel or service.

The invention further provides a video recorder according to the VHS standard including means for reading and decoding data defining displayable text and/or control functions recorded on a tape as a multilevel code at a data rate lower than that of the original data and within the bandwidth of the recorder, the data including row and column address information for defining cursor positions on a screen of associated display apparatus, and function codes associated with the cursor positions, means for enabling a user to position the cursor at a desired position on the display screen, means for receiving command instructions from a user, and means for performing the commands using the function codes associated with the cursor position.

When the data is teletext data as defined in the World System Teletext Standard, the row and column address information and associated function codes may be contained in teletext packets X/26 read from the tape.

The function codes may be arranged to cause one of the following actions to be performed:
  selecting a teletext page number;
  selecting the audio status;
  selecting audio description channel;
  selecting the video status;
  causing a video tape to wind to a defined position;
  causing a command to be sent to associated equipment;
  selecting a data channel or service.

BRIEF DESCRIPTION OF THE DRAWINGS

The above and other features and advantages of the invention will be apparent from the following description, by way of example, of embodiments of the invention with reference to the accompanying drawings, in which FIG. 1a shows a standard broadcast teletext signal, while FIG. 1b shows the effect of the restricted bandwidth of a VHS recorder on the signal of FIG. 1a;

DESCRIPTION OF THE PREFERRED EMBODIMENTS

Figure 1A:
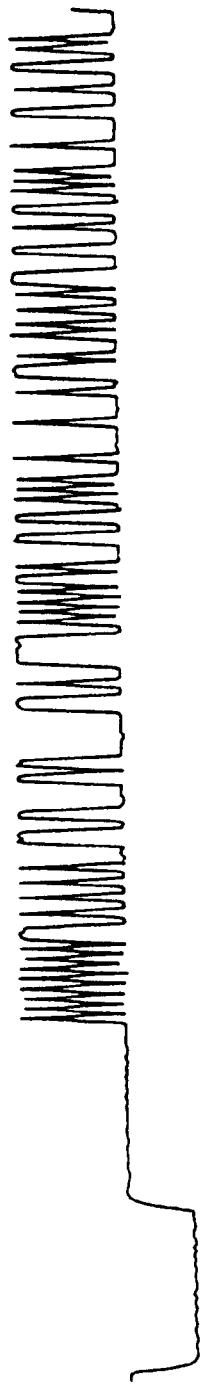
Figure 1B:
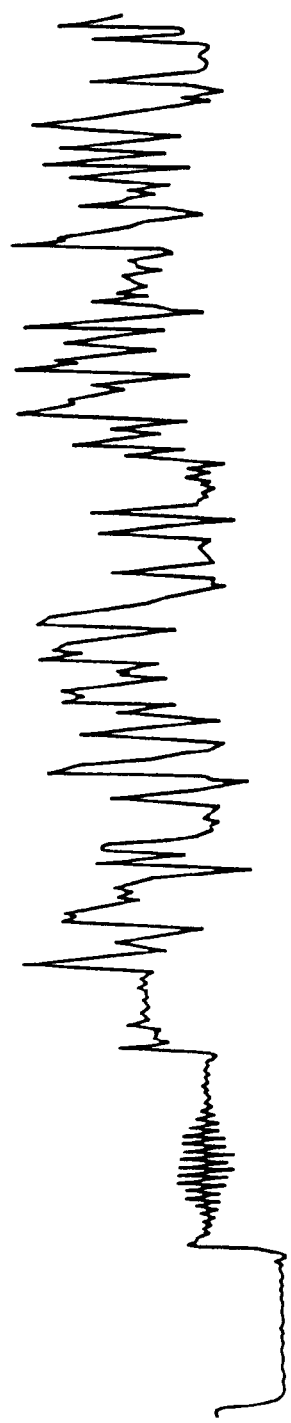

FIG. 1a shows a standard teletext signal as received by a receiver. The data rate of the teletext signal is greater than 5 MHz and consequently, such a signal will be distorted when it is fed through a video recorder, such as one according to the VHS standard which has a channel bandwidth of around 3 MHz. FIG. 1b shows how the teletext signal is affected by the channel bandwidth of a typical VHS recorder. As can be seen, the initial clock run-in information is lost and, on replay, such a signal would not be decodable by a standard teletext decoder. In order to overcome this problem our co-pending UK Patent Application No. 9605614.8, corresponding to U.S. patent application Ser. No. 08/815,024, filed Mar. 14, 1997, discloses the use of a multilevel code which has a data rate which is lower than that of the standard teletext data rate.

Figure 2:
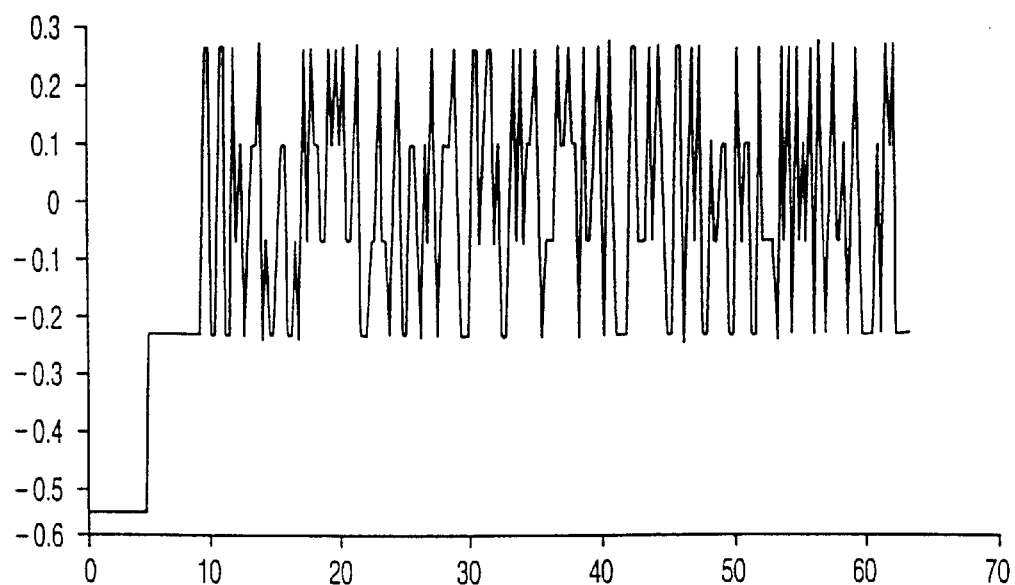
FIG. 2 shows a four level code representing the broadcast teletext signal which is suitable for recording on and replay from a VHS recorder.

FIG. 2 shows a line of teletext data encoded according to a four amplitude level code. The initial clock run-in has been replaced by a lower frequency clock run-in while the framing code and data are replaced by the four level code. The four levels in this instance are four amplitude levels and, consequently, in each data period, two bits can be encoded, the four levels giving the codes 00, 01, 10, and 11. As a result, the teletext signal re-encoded according to the multilevel code now has a data rate of half that of the standard teletext signal and now falls within the bandwidth of the VHS recorder.

Figure 3:
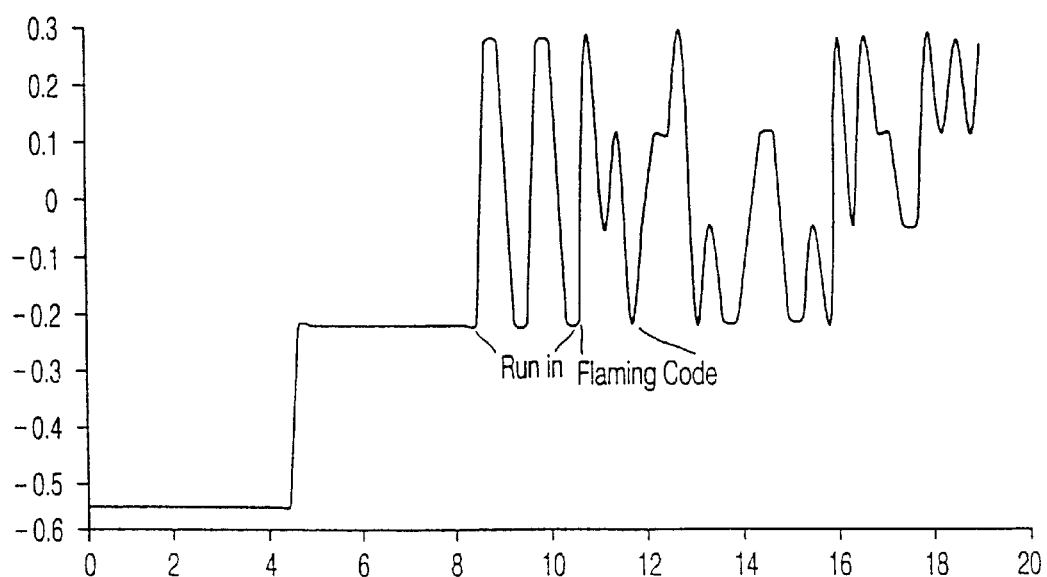
FIG. 3 shows, on an enlarged timescale, a portion of the signal shown in FIG. 2.

FIG. 3 shows the initial part of a teletext line using the multilevel code on an expanded timescale, and indicates the cycles of the clock-run in the framing code and the data. In this case, the clock run-in frequency is arranged to be half that of the standard teletext clock run-in frequency.

Thus, the method of recording teletext data on a tape disclosed in the above-referenced patent application, comprises the step of converting teletext data generated at the standard rate into a multilevel code at a data rate which is lower than that of the standard teletext signal. The multilevel code is then applied to the recording apparatus to enable the data to be recorded on the tape. In a particular embodiment, a four level amplitude code is used and the data rate is half that of the standard teletext signal. If an 8 level code was used, then the data rate could be reduced to one-third of the standard teletext data rate since an 8 level code would allow each data period to encode three bits. While it is preferred to use a multiple amplitude level code as this simplifies the recovery of data by a standard teletext decoder, it is possible to use either a multilevel code comprising a number of different phases or to use a combination of phase and amplitude levels.

On replay, the multilevel code is read from the tape and then converted to standard teletext data in an inverse operation to the conversion on recording. This data can then be fed into a teletext encoder to enable the teletext data to be reassembled with the video signal for transmission to an associated television receiver. The whole process of recording and replaying teletext data in this fashion using a VHS recorder is disclosed in our co-pending UK Patent Application referred to above, the contents of which are hereby incorporated by reference.

In the context of this application, teletext refers to a system, such as World System Teletext, in which the teletext data has a binary data rate which is too high for a standard VHS recorder to record or replay. While the forgoing description with reference to FIGS. 1 to 3 has discussed the recording and subsequent replay or a teletext signal, it will be apparent that teletext data encoded according to this procedure could be prerecorded on tapes for replay by a purchaser or renter of the tapes.

Figure 4:
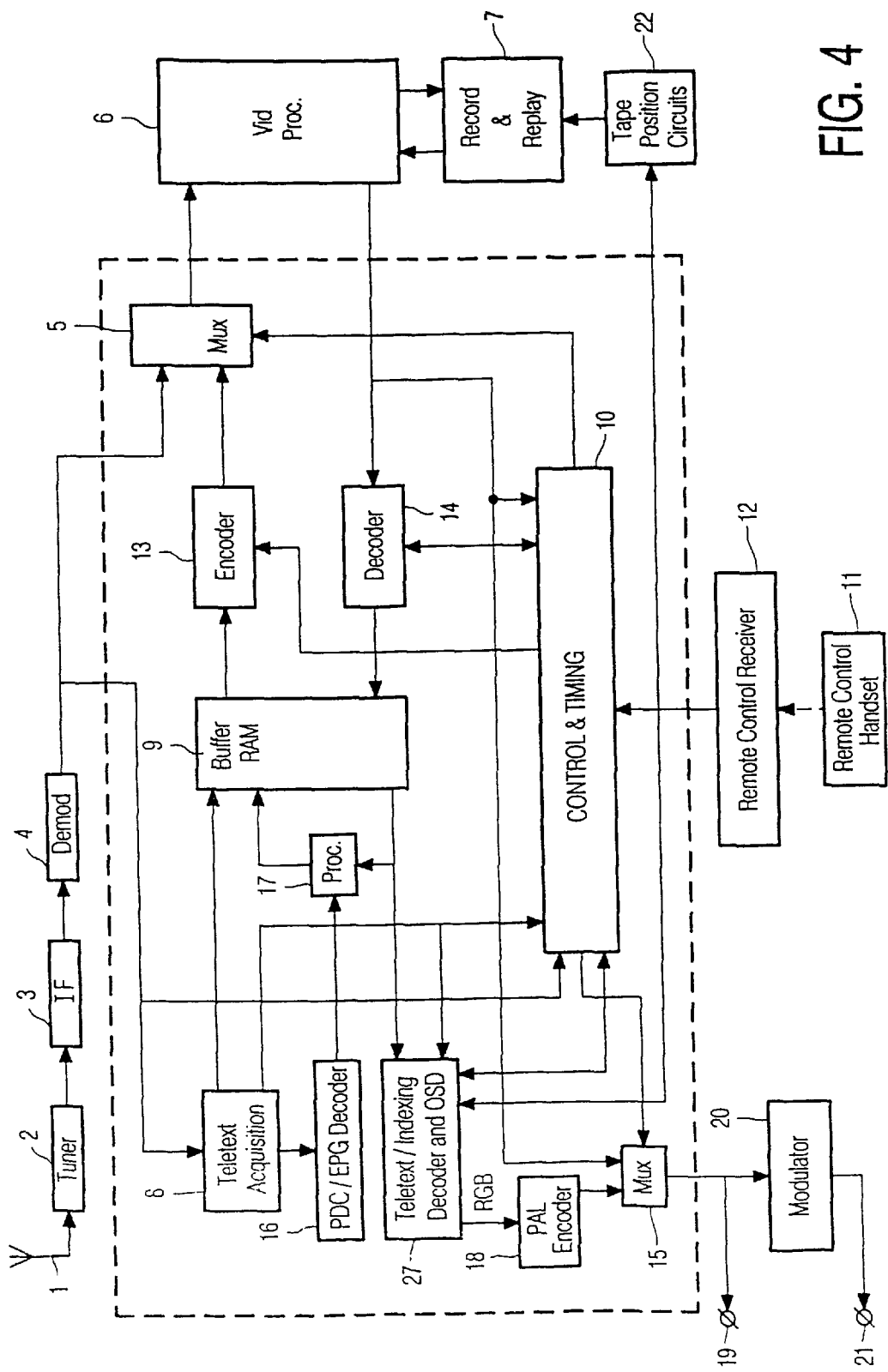
FIG. 4 shows, in block schematic form, video recorder according to the invention.

FIG. 4 is a block schematic diagram of a video recorder according to the invention. It comprises an aerial input 1 which is connected to tuner circuits 2, an IF stage 3, and demodulator 4. These are purely conventional portions of a VHS video recorder. The output of the demodulator 4, which is a standard CVBS signal, is fed through a multiplexer 5 to a video processing circuit 6 of the recorder. The video processing circuit 6 has an output to and input from record and replay heads 7. The output of the demodulator 4 is further connected to a teletext acquisition circuit 8 which acquires teletext data and passes it to a buffer RAM 9. The output from the demodulator circuit 4 is also connected to a control and timing circuit 10 which generates appropriate control and timing signals from the incoming video signal and from instructions received from a remote control handset 11 via a remote control receiver 12. In addition, the control and timing circuit receives a CVBS signal from the video processor 6 on replay of a tape and generates therefrom appropriate control and timing signals.

Teletext data acquired by the teletext acquisition circuit 8 is passed from the buffer RAM 9 to an encoder 13. This encoder is as described in our co-pending UK patent application No. 9605614.8. The encoder 13 encodes the teletext data into a multilevel code at a lower data rate than the standard teletext data rate. This multilevel code is passed through the multiplexer 5 under the control of the control and timing circuit 10 to the video processor 6 during the vertical blanking interval to enable the original teletext data as transmitted to be also recorded but in a modified form using the multilevel code so that it is now within the bandwidth of the recorder. On replay, the output from the video processor 6 is applied to a decoder 14 which takes, during the vertical, blanking interval the teletext data having the multilevel code from the luminance processor and converts it back to teletext data at the standard teletext data rate and inserts this data into the buffer RAM 9. Again this decoder will be of the same form as that disclosed in Uk Patent Application No. 96056148. The CVBS signal from the video processor 6 is also fed to an input of a multiplexer 15.

The teletext acquisition circuit 8 has a further output which is fed to a PDC/EPG decoder 16. This will decode the PDC and EPG signals encoded in the teletext data transmitted. The output of the PDC/EPG decoder is fed to a control processor 17.

On replay, the decoded teletext data from the decoder 14 which has been stored in the buffer RAM 9, is read into a teletextlindexing decoder and on screen display generator 27. This will produce an RGB output which is fed a PAL encoder 18 whose output is connected to a second input of the multiplexer 15. Clearly, if a different standard television signal is being generated, for example, SECAM, an appropriate encoder will replace the PAL encoder. Thus, under the control of the control and timing circuit 10, the multiplexer will select either the video output from the video processor 6 or the teletext and on screen display signal via the PAL encoder 18. The output of the multiplexer may be fed to a SCART terminal 19 or, via a modulator 20, to an aerial output 21. The teletext/indexing decoder 27 has an output which is fed to tape control circuits 22 which cause the tape to wind or rewind to selected positions.

The video recorder described with reference to FIG. 4 is substantially the same as that described in UK Patent Application No. 9605614.8. The modifications in this particular embodiment are the addition of the PDC/EPG decoder 16, control processor 17 and the teletext/indexing decoder and on screen display generator 27. In addition, as the teletext decoder is within the VCR, it is not necessary to include the teletext encoder which is provided in the embodiment in our co-pending application.

On a previously recorded tape, the tape contents are stored on the tape in a defined format using the same data recording method as teletext. The contents list consists of the items on the tape and the start and finish index counter positions which represent playing time from the start. This data is repeated several times near the beginning of the tape so that when a rewound tape is inserted the contents may be quickly read. The contents are stored temporarily, as long as the tape is in the VCR, in an index RAM which is part of the control processor 17. If a new recording is made, then the contents of the index RAM are updated with the positions and duration, and at a suitable time depending on the other functions requested, the tape is made to wind back to the beginning and then to write the new contents data on the tape automatically. An appropriate algorithm defines the best time to carry out this procedure, for example, if two items are programmed to be recorded, the tape contents list is rewritten only after the second item is recorded. If, however, an attempt is made to reject the tape after the first recording, then the system winds to the beginning and updates the contents list before releasing the tape. If the program title is available from a PDC or EPG transmission, this is added to the contents data by the control processor 17 using information derived from the PDC/EPG decoder 16. If the title is not available from such a transmission, then the channel and start time can be recorded as a default setting.

Figure 5:
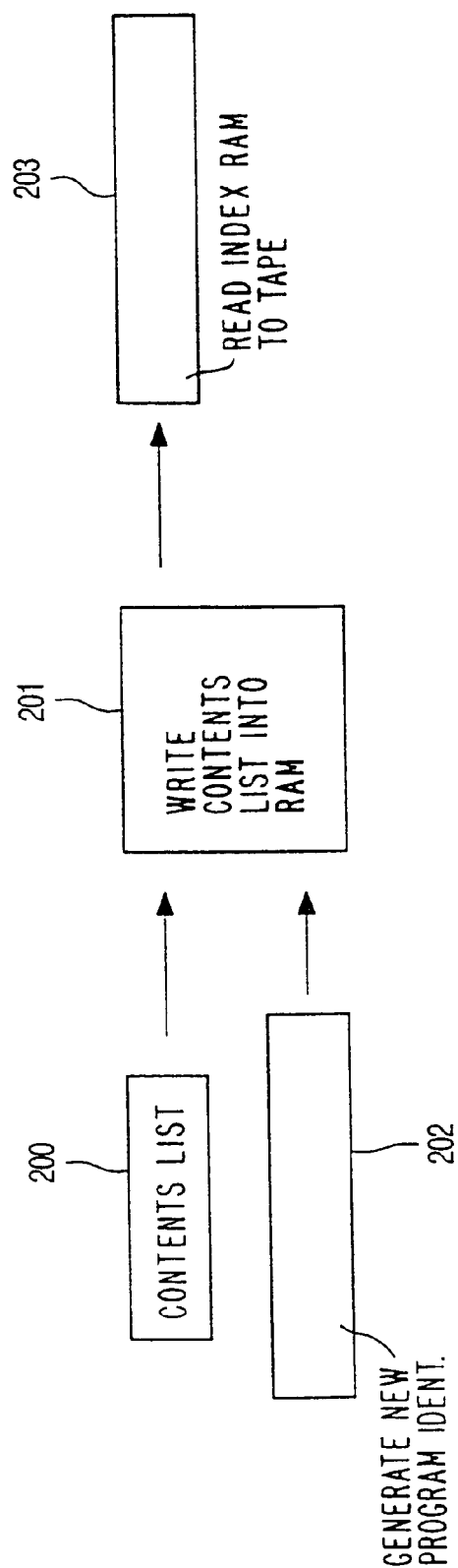
FIG. 5 illustrates the indexing principles of the invention.

The basic principles of the indexing function are shown in FIG. 5 which illustrates how the contents of the tape are read and displayed and the way in which the contents are updated. Box 200 illustrates the contents list on the tape. When the tape is inserted, this contents list is written into the index RAM, this procedure is represented by box 201. When a new program is to be recorded either in addition to the programs already on the tape or as a replacement for one or more of those on the tape, a new program identification from the control system is generated, represented by box 202. As stated before, this will either be the program title obtained from PDC or EPG data or will be the channel number and start time as obtained from the control and timing circuit 10. At a suitable later time when recording has been terminated, the contents of the index RAM are read to the tape, this being represented by box 203.

On insertion of the tape and under appropriate control from the user, the index page will be displayed on an associated television receiver. The user will then select a particular program to be replayed and the indexing decoder 27 will then output appropriate controls to the tape position circuits to cause the tape to drive to the beginning of the program selected to be viewed.

Thus, the selection and replay of a particular program can be effected from the contents list by the user using, for example, a cursor, and the tape will wind to the correct position.

An advantage of such an indexing system is that it is possible to consider different types of services on a video tape as well as the conventional start to stop linear sequence of video material. The tape can be split up into different items or topics which are easily selected from the index using the cursor. If desired, a particular topic can be selected to cycle continuously allowing for unattended display indefinitely for advertising purposes.

When home recordings are made, if the television transmission contains data which identifies the TV program being recorded, such as PDC (program delivery control) or EPG (electronic programming guide), the program title information may be added to the tape contents list automatically. In the absence of such data, the program can be identified on the contents list by the channel and time of recording.

For prerecorded tapes which contain teletext information so that the position of the tape winds can be made to depend on the teletext data in combination with pressing some control keys, this link between teletext and the video and audio material on the tape can be used to provide multimedia facilities which appear to be interactive. By answering questions on the teletext pages using colored keys or cursor movements, the appropriate information, either text or video or both, can be selected. The video material on the tape can be hundreds of short clips or a fewer longer sequences as required. As all possible answers to all the questions are stored on the tape, the system feels interactive and is easy to use. This function also requires additional circuitry in the VCR, but this circuitry is relatively straight forward. The main limitation is the tape winding time but with careful partitioning of the information on the tape, this can be made acceptable for a mass market consumer system.

A feature of the system is the ability to select video items from a teletext page using a cursor. The basic technique is similar to that used in PDC where potential cursor positions on the screen are defined and each cursor position as information associated with it. In the case of PDC, this information is the program identification label of the TV program to be recorded. In the case of the indexing system of the present invention, the information is the tape counter position where the tape should wind to if this cursor position is selected. To use the system, the user reads a teletext page with some text describing alternative choices, for example, a list of birds. A cursor appears automatically on the first bird (avocet). By pressing a key on the handset, the user causes the cursor to jump to the next position (bittern) and so on until the cursor settles on the desired bird, for example, blackbird. Then a different key is pressed which causes the data associated with that cursor position to be loaded into the VCR tape counter system. The tape then winds automatically forwards or backwards as necessary to the starting position of a film clip showing a blackbird and starts playing the video material automatically. Further information associated with the cursor position downloaded into the VCR tape counter identifies the stop position so the video clip stops playing automatically at the end.

A further embodiment of the cursor selection mechanism allows a teletext page to be selected by a cursor movement in the same way. A different address code in the data associated with the cursor position identifies whether the data is for a tape counter position or a teletext page number. It is also possible for the same cursor position to have both a tape counter position and a teletext page number. In this case, when the user selects this item, the tape winds and a new teletext page is selected.

Control functions are included so that when an item is selected, the system knows whether to switch to video only or teletext, which can include mixed video and teletext, whether to play the tape continuously, stop at a particular point or then wind to another position, whether a new teletext page should be selected automatically, or many other functions. Similar features to the above can also be provided in association with the colored keys on the remote control handset in a similar way to Fastext so that new pages and tape positions may be selected from the recorded information by pressing colored keys instead of moving a cursor.

A method of associating control and address data with a cursor position is already known from PDC, see for example, European Patent Application EP-A-0300562, corresponding to U.S. Pat. No. 4,908,707. A more comprehensive control method is now proposed which enables the user to select items or functions by simple cursor movements using select up, select down and OK keys to perform particular tasks. These tasks may be initiated from broadcast data, not just data recorded on tape. If required, more than one task command can be associated with the same cursor position. In that case, if the user chooses that cursor position, then all the tasks associated with it are performed. The following non-exhaustive list of tasks may be performed:

1. selecting a teletext page number,
2. selecting the audio status including audio description channel,
3. selecting the video status,
4. causing a video tape to wind to a particular position,
5. causing a command to be sent to a piece of equipment or system, and
6. selecting a data channel or service.

The codes to perform these functions are all contained in teletext packets X/26 containing groups of data which are of two types. A row address group and a column address group. A pair of these groups, row and column, defines the potential cursor position on the screen and the command and data to be associated with that position. As each address group has 7 bits of data, 14 bits are available for each cursor position. With the available capacity of packets X/26, up to around 100 tasks can be performed from one display page. The following description gives an example of a particular coding for various functions to be selected by the viewer, and an example of an interactive indexing from prerecorded material which shows how a user can select given information from the tape using cursor control.

Proposed Coding
Selecting a Teletext Page Number
Row group mode 00101 column group 00101
14 bits data split as:
    11 bits page number (3 bits magazine, 4 bits page tens, 4 bits page units) allowing 2048 page numbers (hexadecimal as well as the 800 decimal pages)
    1 bit for stay in text mode (0) or switch to video mode (1)
    1 bit for instant mode switch (0) or delay until index event (1)
    1 bit for end of action (0) or auto select next page after NEXT index event (1)
Selecting the Audio Status
Row group mode 10100 column group 00101
14 data bits split as: 2 bits mode:
    00 normal, no audio description
    01 audio description headphone channel 1 only
    10 audio description headphone channels 1 and 2 only
    11 audio description on all sound channels
    3 groups of 4 bits for audio description selection (e.g language)
        first group audio description for main (loudspeaker) channel
        second group audio description for headphone channel 1
        third group audio description for headphone channel 2
Selecting the Video Status
Row group mode 11001 column group 00101
14 data bits split as: 2 bits mode:
    00 normal, single screen
    01 dual picture, split screen
    10 multiple source for user choice
    11 3D stereoscopic
    3 groups of 4 bits for video source selection:
    first group video source for main display screen
    second group video source for auxiliary channel 1
    third group video source of auxiliary channel 2
    each 4 bit address represents the channel of the source video material, e.g normal, one of the three parallel digital sources (see our co-pending application No. 08/135,181 graphics generator, external input, etc . . .
Winding a Tape to a Particular Position
Row group mode 11010, 11011, 11100 or 11101 depending on function (see below), column group 00101
14 bits data: indication of index position in seconds (coded binary) counting from 0 at the start of the tape, maximum value 16383 seconds, approx 273 minutes or over 4.5 hours, sufficient for the longest VHS tape (timing done at standard play speed)
The row group mode indicates the indexing function to be performed, as follows:
11010 wind to index position then play
11011 wind to index position then stop
11100 play until index position, then automatically follow next 11010 or 11011 command
11101 play until index position then stop
Sending a Command to Equipment or Selecting a Data Channel or Service Row group mode 11110, column group 00101
14 data bits split as: 1 bit for command (0) or data channel selection (1)
  If a command, then remaining 13 bits split as:
  1 bit for single or multiple command (0=last data, 1=more data to follow)
  4 bits for type, purpose and/or destination of command 16 possibilities to be defined, but such as:
    output to modem for interactive service
    output to DTMF dialler for interactive service
    command to bus for controlling domestic equipment
    command to local equipment to, e.g., select another function
    command to print data or a picture
    command to record data in a bulk memory
    command to initiate a processing function (macro) etc.
  8 bits for command data
  if data channel selection, remaining 13 bits split as:
  1 bit for mode (0=unidirectional, 1=bidirectional or handshake required)
  8 bits for source address of data channel
  4 bits for destination address of data channel A kind of "telephone exchange" function is provided for digital data streams, to allow any source of data to be connected to any "destination" (may be a connector, processing function, encoder, etc.). For example, "connect data channel 23 off tape to the USB connector", or "receive data from modem to be connected to processing function X" etc. The source and destination addresses are defined in a master table as each new facility is used, for standardization.

Figure 6A:
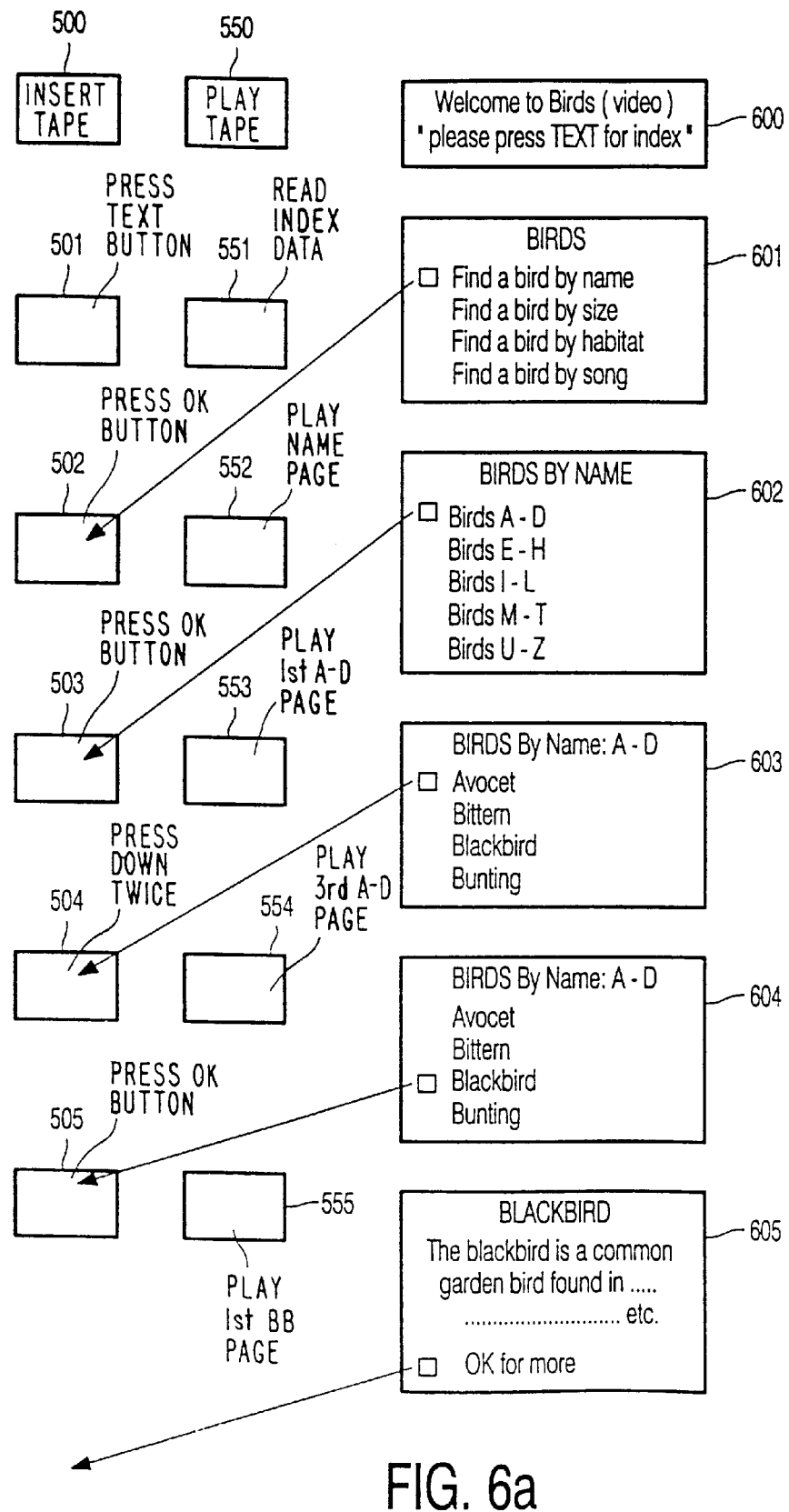
FIGS. 6a and 6b illustrate a cursor control method according to the invention for enabling control of the video recorder of FIG. 4.
Figure 6B:
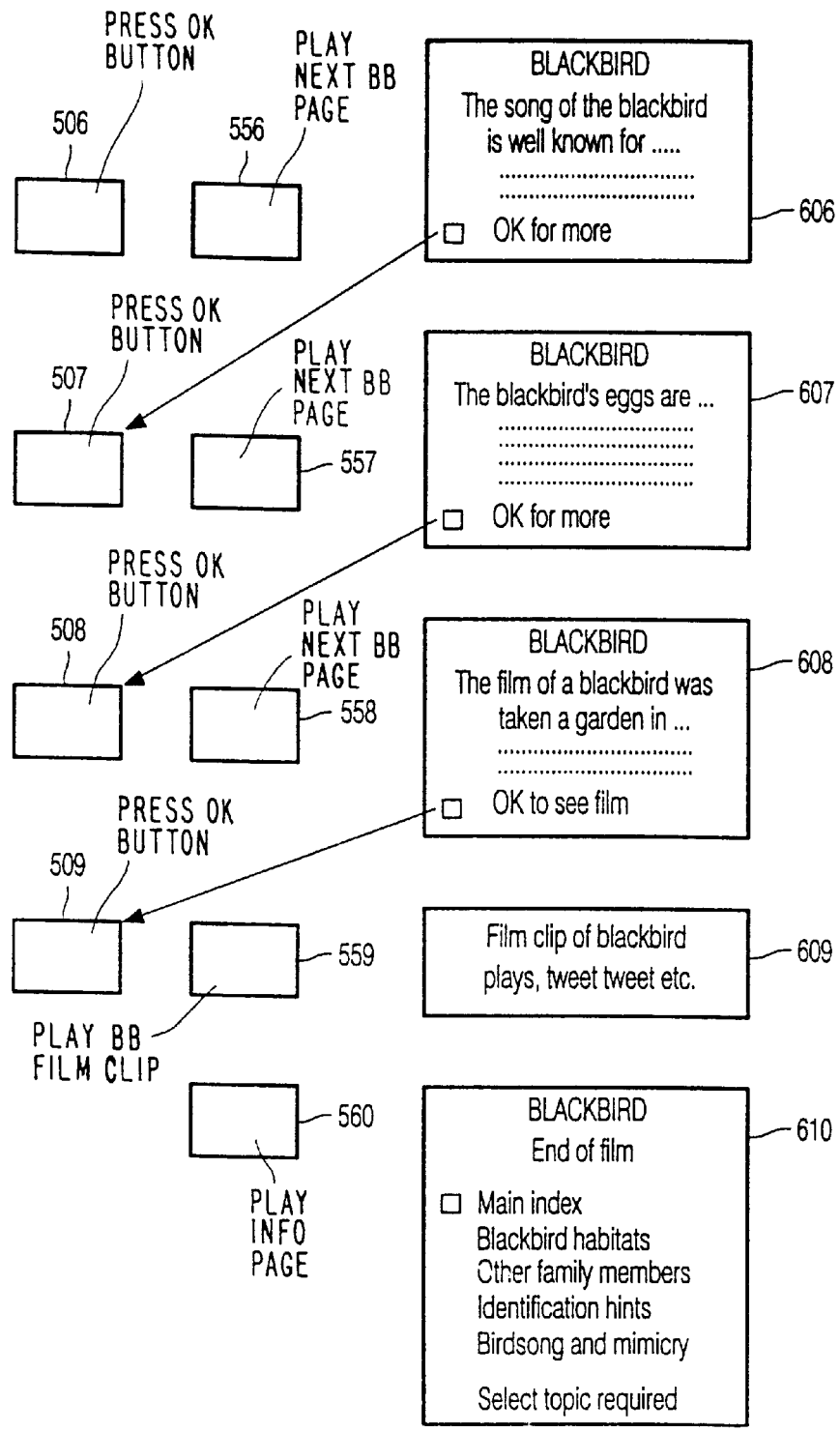

FIGS. 6a and 6b, illustrate the process of accessing a particular portion of a tape.

FIGS. 6a and 6b shows three columns of boxes, the first column representing user actions, that is, the interaction of the user of the apparatus using, for example, a remote control handset, the second column shows the appropriate VCR function which is performed by the action of the user, and the third column shows the messages displayed on the screen of an associated television receiver. In FIG. 6a, the first user action, box 500, is to insert the tape. Box 550 represents the VCR function corresponding to this, i.e., to play the tape. The corresponding display, represented by box 600, as an example gives the title "Welcome to Birds"; and the instruction "please press text for index". The user action which follows, if the user wishes to continue viewing this video, is to press the text button on the remote control unit, this is represented by box 501. The resulting VCR function is to read the index data, which is represented by box 551. As a result, the display, box 601, displays a list of choices as to how to progress from this stage. In the particular example shown, there are four choices; the first being to find a bird by name, the second to find a bird by size, the third to find a bird by habitat, and the fourth to find a bird by song. In this example, the cursor is shown opposite the first choice and if the user wishes to find a bird by name, he or she then presses the OK button, which action is represented by box 502. The resulting action by the VCR, represented by box 552, is to play, storing the index pages and selecting the bird by name page. In this particular example, the display, box 602, then displays an alphabetical selection and one of these portions of the alphabet is chosen, in this case, birds starting with the letters A to D. The user again presses the OK button, this action being represented by box 503. The action of the VCR is to wind to the birds A part of the tape, index pages for birds A to D already stored, and select the first of those. This action is represented by box 553. The corresponding display, box 603, has an alphabetical list of birds and the cursor is against the first one, avocet. The user decides that it is wished to view details of the blackbird and thus presses the cursor down key twice. This action is represented by box 504. The action of the VCR is then to continue winding up to the third birds A to D index page part of the tape and then play, box 554. The screen display then shows the cursor opposite the blackbird title, box 604. The user then presses the OK button, box 505, and the VCR continues to play, loading information pages and selecting the first blackbird page, this action being represented by box 555. The corresponding display, box 605, then gives an introduction to the blackbird and the cursor is aligned alongside a link to more information and instructs the user to press the OK button if more information is desired. Assuming that the user does want more information, the OK button is pressed again, this action being represented by box 506. The VCR then winds the tape to the start of the video material for the blackbird and selects the next blackbird information page, this action being represented by box 556. The display then gives some further information on the blackbird and again gives an instruction to the user by placing a cursor alongside an "OK for more" instruction which instructs the user, if more information is required, to again press the "OK button", this being represented by box 507. The VCR then selects the next blackbird information page continues winding until the start position of blackbird video and then stops, this action being represented by box 557. This action may happen earlier or later in the information page sequence depending, inter alia, on winding time, the speed of reading information pages, and how many of these information pages are available. The resultant display, as represented by box 607, is more information on the blackbird and again an instruction to the user to press the "OK button" for more information. The user then presses the OK button again, represented by box 508 and the VCR selects the last blackbird information page, this action being represented by box 558. While this is going on, the VCR will be winding to the start position of the blackbird video and normally by the time the user has read the various information pages, the tape will have arrived at the start of the blackbird video. The display, as represented by box 608 then displays the last blackbird information page and also an instruction to press the "OK button" if the user wishes to see the film. If so, the user then again presses the OK button, this action being represented by box 509 and the video recorder switches to video and starts displaying the film clip as represented by box 559. It may also load into background memory new information pages and prepare to display them after the next index event that is the end of the film clip position. The display, represented by box 609, then displays the film clip of the blackbird giving, for example, details of its flight, habitat, and song. At the end of the film clip, the VCR will stop and switch to text and the next information pages will be loaded, this action being represented by box 560. The corresponding display, as represented by box 610, will be the main index page for the blackbird and the user will be invited to select other topics if required. If such other topics are required, then the user will use the up/down keys of the remote control handset to move the cursor to the appropriate index item and the VCR function will resume looking for the selected part of the tape.

It can be seen that using this cursor control method, it is possible to give an interactive feel to the use of the tape. By appropriate programming of the tape, the indexing information can be presented to the user while the tape is simultaneously fast winding to the start of the video clip. Thus, the winding time of the tape can be masked by giving the user information read from teletext data which is useful and informative while the tape is winding to the position where a film clip is recorded. The use of packet X/26 data to perform the control enables a wide variety of control functions to be performed. As can be seen from the foregoing, a teletext page number, the video status, and the winding of a tape to a particular position can all be achieved using data programmed into packet X/26. This is similar to the PDC information which is programmed into packet X/30 for the control of the recording of "off air" programs by a video recorder.

While the foregoing description illustrates the use of data encoded in a teletext format, it is possible to record data encoded in forms other than the teletext format, the data having a data rate greater than that normally recordable and reproducible by a VHS recorder by using the same technique to reduce its data rate to lie within the bandwidth of a VHS recorder. Examples of such data which can represent displayable text and/or control functions include Multimedia Hypertext Experts Group MHEG-5 standard and Hypertext Mark Up Language HTML. Thus, both these examples provide information as to how to display text and graphics on screen and allow data to be associated with particular locations on screen, for example, cursor position, button functions, hypertext links, etc. Thus a sequence of events can be initiated by a user without requiring intermediate instructions, the actions of the recorder being controlled by data associated with cursor positions button or hypertext link positions, etc., in the same way as described with reference to the examples using teletext format data.

From reading the present disclosure, other modifications will be apparent to persons skilled in the art. Such modifications may involve other features which are already known in the design and use of video tapes, video recorders teletext data bases, encoders and decoders and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. Applicant hereby gives notice that new claims may be formulated to such features and/or combinations of such features during the prosecution of the present application or of any further application derived therefrom.

What is claimed is:

1. A method of controlling a video recorder according to the VHS standard, the video recorder including means for decoding data defining displayable text and/or control functions recorded on a tape as a multilevel code at a data rate lower than that of the original data and within the bandwidth of the recorder, wherein the data includes row and column address codes for defining cursor positions on a display screen of an associated television receiver and function codes defining tasks to be performed on initiation of a command instruction when the cursor is displayed at a given location, the method comprising the steps:

reading data from the tape;

positioning the cursor at a desired one of the defined positions on the display screen; and initiating the task to be performed using the function codes associated with the cursor location.

2. The method as claimed in claim 1, wherein the data is teletext data.

3. The method as claimed in claim 2, wherein the teletext data is as defined in the World System Teletext Standard.

4. The method as claimed in claim 3, wherein the row and column address codes and the associated function codes are contained in teletext packets X/26.

5. The method as claimed in claim 1, wherein the function codes are arranged to cause one or more of the following actions:

selecting a teletext page number;

selecting the audio status;

selecting audio description channel;

selecting the video status;

causing a video tape to wind to a defined position;

causing a command to be sent to associated equipment; and selecting a data channel or service.

6. A video recorder according to the VHS standard comprising:

means for reading and decoding data defining displayable text and/or control functions recorded on a tape as a multilevel code at a data rate lower than that of the original data and within the bandwidth of the recorder, the data including row and column address information for defining cursor positions on a screen of associated display apparatus and function codes associated with the cursor positions;

means for enabling a user to position the cursor at a desired position on the display screen;

means for receiving command instructions from a user; and means for performing the commands using the function codes associated with the cursor position.

7. The video recorder as claimed in claim 6, wherein the data is teletext data.

8. The video recorder as claimed in claim 7, wherein the teletext data is as defined in the World System Teletext Standard.

9. The video recorder as claimed in claim 8, wherein the row and column address information and associated function codes are contained in teletext packets X/26 read from the tape.

10. The video recorder as claimed in claim 6, wherein the function codes are arranged to cause one or more of the following actions to be performed:

selecting a teletext page number;

selecting the audio status;

selecting audio description channel;

selecting the video status;

causing a video tape to wind to a defined position;

causing a command to be sent to associated equipment; and selecting a data channel or service.

* * * * *